Dec. 31, 1968
G. R. CURTIS
3,418,853
BLOOD PRESSURE TRANSDUCER
Filed Jan. 10, 1966
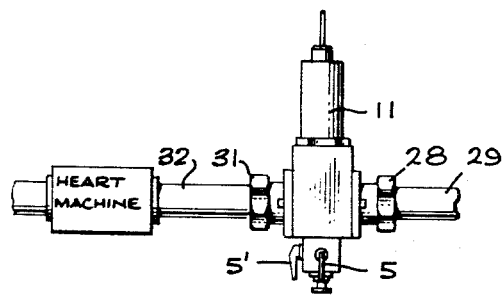
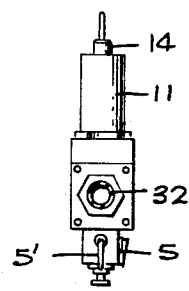
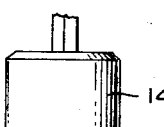
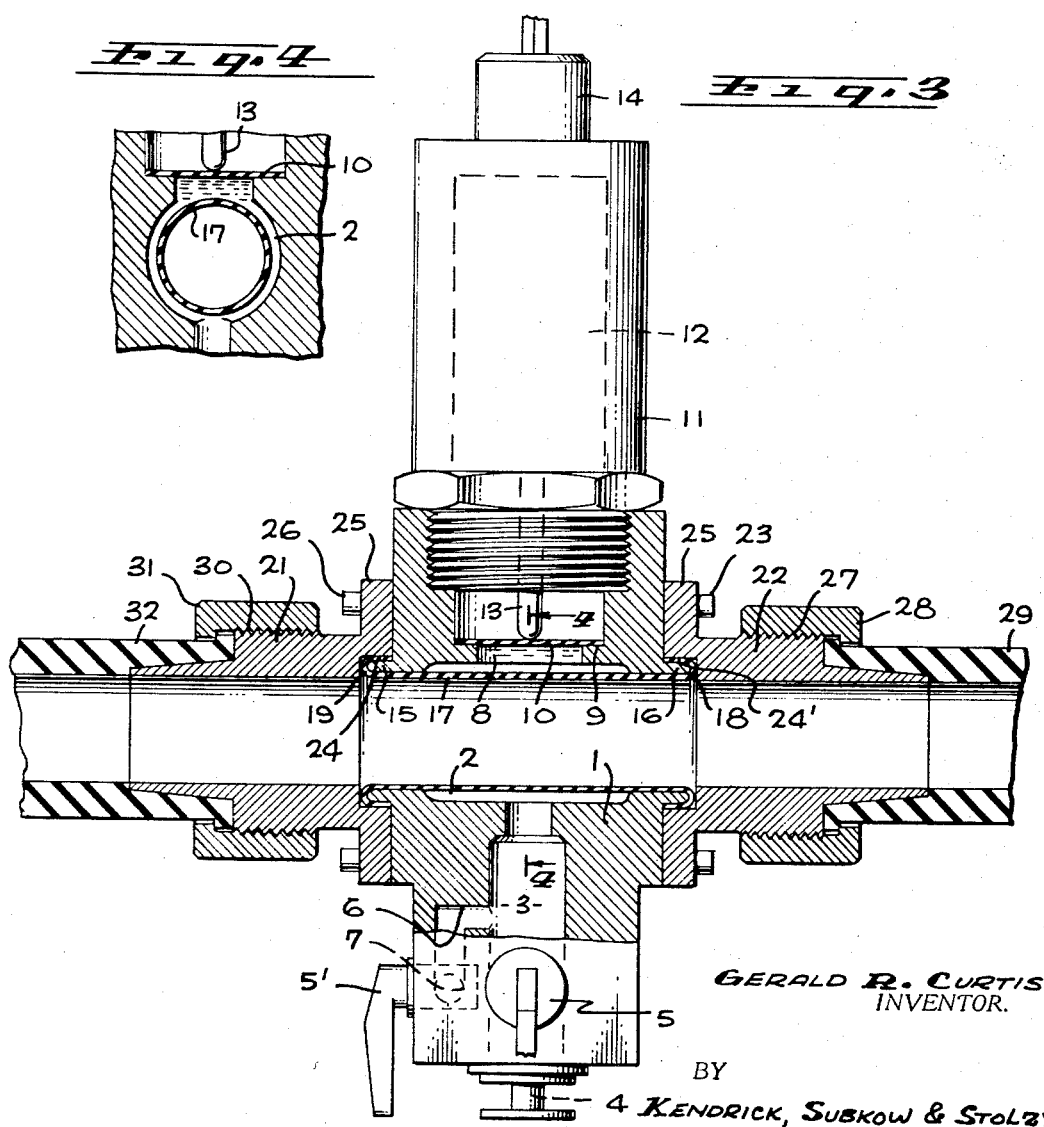
GERALD R. CURTIS
INVENTOR.
BY
KENDRICK, SUBKOW & STOLZY
ATTORNEYS United States Patent Office 3,418,853
Patented Dec. 31, 1968

3,418,853
BLOOD PRESSURE TRANSDUCER
Gerald R. Curtis, Ojai, Calif., assignor to Statham Instruments, Inc., Los Angeles, Calif., a corporation of California
Filed Jan. 10, 1966, Ser. No. 519,509
2 Claims. (Cl. 73—406)

ABSTRACT OF THE DISCLOSURE

A housing has a continuous bore disposed in serial relation to a blood transmission conduit. Within the housing bore there is provided a chamber surrounding the bore and separated therefrom by a flexible cylindrical member of substantially the same dimensions as the bore cross-section. Inlet and outlet openings are provided to the chamber. A flexible diaphragm isolates the outlet opening from the chamber interior. Coupling fluid is provided to the chamber via the inlet opening. A pressure transducer is received within the outlet opening and has actuating parts in contact with the diaphragm such that as blood passes along the transmission conduit its pressure is transmitted via the flexible member through the coupling fluid and diaphragm to the transducer.

---

This invention relates to a blood pressure transducer particularly designed for use with heart machines.

As is now generally known, heart machines are employed to circulate blood from a living body and to bypass the heart during surgery.

It is desirable to measure the output pressure of the heart pump so as to regulate the pressure of the return flow of blood. However, the introduction of a pressure transducer into the flow stream causes a change in the flow pattern of the blood or introduces a turbulence which is not desirable. Both influences may cause hemolysis, that is, a destruction of the blood cells. Since the blood is circulated many times during the period of use of the heart machine, the hemolysis may reach a dangerous level.

Hemolysis is caused by the friction imposed on the blood cells. This may arise from frictional contact with surfaces which are foreign to the arterial or venous surfaces of the body, and it may arise from viscous drag or turbulence in the blood stream.

It is therefore an object of my invention to design a pressure transducer in which the flow stream which is sensed by the transducer is not modified disadvantageously in entering or leaving the transducer or during flow therein.

I accomplish this result by maintaining the flow path through the transducer to be of the same dimension and geometry as the flow channel at the entrance to and exit from the transducer.

It is another object of my invention to design a transducer which will have a frequency response as high as the highest frequency of the blood pressure fluctuation which it is desired to measure.

I accomplish this result by introducing an hydraulic couple between the blood flow path and the pressure transducer, so as to impose a minimum restraint between the blood flow pressure and the hydraulic medium used as the pressure transfer medium between the blood flow and the transducer, which is employed to translate the blood pressure and blood pressure variations into intelligible signals. For this purpose I prefer to use transducers employing strain sensitive filaments. Such transducers can be made to have a frequency response as high as the highest frequency of the blood flow pressure variation.

In order to provide a partition between the blood stream path and the hydraulic coupling fluid, I employ a flexible diaphragm which will have a minimum stiffness, and desirably one of negligible stiffness, so that substantially the entire pressure of the blood is transmitted to the hydraulic coupling fluid.

In my preferred embodiment, I employ a thin plastic tube such as is made of a plastic commonly employed as conduits in heart machines and in fluid flow meters and other places in contact with the whole blood of living bodies. Such a material is "Silastic," understood to be a silicone polymer.

These and other objects of my invention will be understood by reference to the drawings, which show one specific embodiment of my invention which I now contemplate to be the best mode for making and using my invention, in which:

FIG. 1 is a plan view of the transducer as shown attached to a heart machine;
FIG. 2 is a view taken at a right angle to FIG. 1;
FIG. 3 is a sectional view through FIG. 1 with parts in section and parts in elevation; and
FIG. 4 is a fragmentary section taken along line 4—4 of FIG. 3.

The housing 1 is bored and counterbored to form a cylindrical diaphragm chamber 2 extending radially and axially in the said housing. The radial conduit 3 is bored through the housing to intersect the diaphragm chamber 2 and provide a fill hole 4 in which there is a stop cock 5. A secondary channel 6 is connected to the bore 3 between the stop cock 5 and the diaphragm chamber 2 and connects to transverse bore 7, which exits to the exterior of the housing and in which bore there is a stop cock 5'.

Positioned diametrically from the fill hole 4 is a channel 8 which connects to the diaphragm chamber 2. A shoulder is provided circumambiently about the channel 8 to produce an annular ledge 9 on which is securely mounted a flexible diaphragm 10 rigidly connected at its periphery to the annular ledge 9.

The transducer housing 11 is screwed into the housing 1. The transducer, for example, a strain gage such as shown in U.S. Patent No. 3,058,348, may be mounted in the housing 11. The rod 13, which connects to the movable member of the transducer, is mounted in contact with the diaphragm 10, or may be rigidly connected thereto as by welding. The cable connector 14 is mounted in the housing 11 for connection to the strain gage wires and the strain filaments in the transducer 12, as is conventional for such transducers.

The housing 1 is formed with an annular ledge 15 on one side of the housing and an annular ledge 16 on the other side of the housing. The flexible cylindrical membrane 17 is mounted in the diaphragm chamber 2 spaced from the circumambient wall of the diaphragm chamber 2. It is preferably made of a physiologically inert organic polymer elastomer such as polyethylene or "Silastic" (or silicone polymer), frequently used when it is to be in contact with blood.

The cylindrical tube 17 is looped at the end 19 over the ledge 15 and at the end 18 over the ledge 16. It is held clamped in place by the flow fittings 21 and 22, held in position by the bolts 23 and 26. The fittings are formed with the counterbores 24 and 24', respectively, which fit over the loops 19 and 18 to hold them clamped in fluid tight position. The fittings are formed with external threads 27 and 30, on which are mounted clamping nuts 28 and 31, which hold in position the entrance and exit conduits 29 and 32.

It will be observed that the internal diameter of the tubes 32, the fittings 25, the cylindrical diaphragm 17, the fitting 22 and the tube 29 are all cylindrical in cross section and of uniform diameter at the entrance, through the entrance fittings, through the circular diaphragm and through the exit fitting into the exit tube 29.

Instead of using the diaphragm described above made of organic elastomer, I may use a thin wall metal tube, provided it is flexible enough for the purposes to be described hereinbelow.

In order to make the device operative, the unit is filled by erecting the pressure transducer so that the fill hole is vertical and the stop cock 4 is open to permit the entry of fluid from 4 into 3, and the stop cock 5' is positioned to open communication between the exit hole 7 and the passage 3. Liquid which is physiologically acceptable if it enters the blood, for example, saline solution, is introduced into 4 until it fills the chamber and overflows through 7, thus ensuring that all air within the fluid passageways 4, 5, 3, 2, 8, 6 and 7 is completely removed and the passageways completely filled with liquid, whereupon the stop cocks 5' and 5 are closed.

When blood flow is imposed through 17, the pressure on the diaphragm is transmitted substantially completely through the diaphragm and to the liquid in 8 and from the liquid in 8 to the diaphragm in 10 and to the transducer through the probe 13. All variations of pressure will thus also be recorded.

While I have described particular embodiments of my invention for the purpose of illustration, it should be understood that various modifications and adaptations thereof may be made within the spirit of the invention, as set forth in the appended claims.

I claim:
1. A pressure transducer comprising a housing, a cylindrical diaphragm in said housing, a diaphragm chamber in said housing, said diaphragm chamber having a wall circumambient about and spaced from the cylindrical diaphragm, the ends of said diaphragm forming a fluid tight seal with said housing, an entrance fitting attached to said housing at one end of said cylindrical diaphragm, an exit fitting attached to said housing at the other end of said cylindrical diaphragm; a second diaphragm in said housing at said diaphragm chamber and spaced from said cylindrical diaphragm, and a pressure sensing transducer mechanically coupled to said second diaphragm; and means to fill said diaphragm chamber with liquid including a fill channel extending from the exterior of said housing into said diaphragm chamber, a stop cock in said channel, a second overflow channel extending from the exterior of said housing and connecting to said first-mentioned channel, and a stop cock in said second channel, whereby said diaphragms are hydraulically coupled and pressure in the interior of the cylindrical diaphragm is transmitted to said pressure measuring transducer.

2. A pressure transducer comprising a housing, a cylindrical diaphragm in said housing constructed of a physiologically inert organic polymer elastomer, a diaphragm chamber in said housing, said diaphragm chamber having a wall circumambient about and spaced from the cylindrical diaphragm, the ends of said diaphragm forming a fluid tight seal with said housing, a tubular flow entrance fitting attached to said housing at one end of said cylindrical diaphragm, a tubular flow exit fitting attached to said housing at the other end of said cylindrical diaphragm, the internal diameters of said fittings and said diaphragm being substantially equal; a second diaphragm in said housing at said diaphragm chamber and spaced from said cylindrical diaphragm, and a pressure sensing transducer mechanically coupled to said second diaphragm; and means to fill said diaphragm chamber with liquid including a fill channel extending from the exterior of said housing into said diaphragm chamber, a stop cock in said channel, a second overflow channel extending from the exterior of said housing and connecting to said first-mentioned channel, and a stop cock in said second channel, whereby said diaphragms are hydraulically coupled and pressure in the interior of the cylindrical diaphragm is transmitted to said pressure measuring transducer.

References Cited
UNITED STATES PATENTS

| 3,058,348 | 10/1962 | Statham | 338—42 |
| 3,163,529 | 12/1964 | Jewett | 73—406 |
| 3,333,464 | 8/1967 | Statham | 73—398 |

OTHER REFERENCES

McGregor, Medical Applications of Silicon Rubber Tubing, The Bulletin of Dow Corning Center for Aid to Medical Research, Midland, Mich., vol 3, No. 1, pp. 1 and 2, January 1961, copy in 128/Silicone Digest.

S. CLEMENT SWISHER, *Primary Examiner.*

D. E. CARR, *Assistant Examiner.*

US. Cl. X.R.

73—398. 407